(12) United States Patent
Sanderson et al.

(10) Patent No.: US 11,926,482 B2
(45) Date of Patent: Mar. 12, 2024

(54) LUGGAGE PROCESSING STATION

(71) Applicant: ICM AIRPORT TECHNICS PTY LTD, Botany (AU)

(72) Inventors: Michael Dupre Sanderson, Willoughby (AU); Rainer Rudolf Dinkelmann, South Coogee (AU); Paul Craig Bellamy, Ashtead (GB); Christian Riegman, Greensborough (AU); Kenneth Scott Ifield, Castlecrag (AU)

(73) Assignee: ICM Airport Technics Pty Ltd, Botany (AU)

( * ) Notice: Subject to any disclaimer, the term of this patent is extended or adjusted under 35 U.S.C. 154(b) by 794 days.

(21) Appl. No.: 17/010,930

(22) Filed: Sep. 3, 2020

(65) Prior Publication Data

US 2020/0401956 A1    Dec. 24, 2020

Related U.S. Application Data

(63) Continuation of application No. 15/711,640, filed on Sep. 21, 2017, now Pat. No. 11,042,817, which is a
(Continued)

(30) Foreign Application Priority Data

Jul. 28, 2010  (AU) ............................. 2010903430

(51) Int. Cl.
  *B65G 43/08*  (2006.01)
  *B64F 1/36*  (2017.01)
  (Continued)

(52) U.S. Cl.
  CPC .............. *B65G 43/08* (2013.01); *B64F 1/366* (2013.01); *B65G 43/10* (2013.01); *G06Q 10/02* (2013.01); *B65G 2201/0264* (2013.01)

(58) Field of Classification Search
  CPC .......... B64F 1/366; B65G 43/08; G06Q 10/02
  See application file for complete search history.

(56) References Cited

U.S. PATENT DOCUMENTS

| 5,793,639 A | * | 8/1998 | Yamazaki | ............... | G06Q 10/02 700/226 |
| 6,044,353 A | * | 3/2000 | Pugliese, III | .......... | G06Q 10/08 705/13 |

(Continued)

FOREIGN PATENT DOCUMENTS

EP    0556037 A1    8/1993

OTHER PUBLICATIONS

Whitman College, 12.5 Lines and Planes, Retrieved from the Internet on Nov. 13, 2020, URL: https://web.archive.org/web/20130817090354/www.whitman.edu/mathematics/calculus_online/section12.05.html. (Year: 2013).
(Continued)

*Primary Examiner* — Thomas Randazzo
(74) *Attorney, Agent, or Firm* — Finnegan, Henderson, Farabow, Garrett & Dunner LLP

(57) ABSTRACT

An example luggage processing station comprises: an injector adapted to receive a piece of luggage, the injector comprising an injector conveyor belt integrated into a floor of the injector; a group of sensors positioned around the injector directed towards the injector conveyor belt; a controller adapted to assess the piece of luggage compared to an acceptance parameter whilst the piece of luggage is stationary on the injector conveyor belt; and the controller is configured to actuate the injector conveyor belt when the controller assesses the piece of luggage as meeting the acceptance parameter.

14 Claims, 6 Drawing Sheets

Related U.S. Application Data continuation of application No. 13/812,616, filed as application No. PCT/AU2011/000957 on Jul. 28, 2011, now Pat. No. 9,940,588.

(51) Int. Cl.
  *B65G 43/10* (2006.01)
  *G06Q 10/02* (2012.01)

(56) References Cited

U.S. PATENT DOCUMENTS

| | | | | |
|---|---|---|---|---|
| 6,476,718 B1* | 11/2002 | Cartwright | ............ | G06K 17/00 |
| | | | | 340/568.1 |
| 7,039,154 B1* | 5/2006 | Ellenbogen | ............ | G01V 5/005 |
| | | | | 378/57 |
| 7,522,053 B2* | 4/2009 | Johnson | ............ | B64F 1/368 |
| | | | | 53/461 |
| 9,159,181 B2* | 10/2015 | Hernot | ............ | G07F 7/0636 |
| 2007/0109127 A1* | 5/2007 | Johnson | ............ | B64F 1/368 |
| | | | | 340/572.1 |
| 2009/0295544 A1* | 12/2009 | Bayer | ............ | G06Q 10/08 |
| | | | | 235/492 |
| 2010/0018839 A1* | 1/2010 | Tan | ............ | B64F 1/366 |
| | | | | 198/510.1 |
| 2022/0067596 A1* | 3/2022 | Sanderson | ............ | B65G 43/08 |

OTHER PUBLICATIONS

Siebot, File: Check in BKK Airport.jpg, Wikimedia Commons, Mar. 11, 2007, URL: https://commons.wikimedia.org/wiki/File:Ceck_in_BKK_Airport.jpg.

Sanderson, Michael Dupre et al.: U.S. Appl. No. 13/812,616, filed Apr. 7, 2013, now issued as U.S. Pat. No. 9,940,588, issued on Apr. 10, 2018, entitled: "Luggage Processing Station".

Sanderson, Michael Dupre et al.: U.S. Appl. No. 15/711,887, filed Sep. 21, 2017, now issued as U.S. Pat. No. 11,042,817, issued on Jun. 22, 2021, entitled: "Luggage Processing Station".

U.S. Appl. No. 15/711,640, Luggage Processing Station, filed Sep. 21, 2017.

U.S. Appl. No. 15/711,887, Luggage Processing Station, filed Sep. 21, 2017.

Sanderson, Michael Dupre, et al.: PCT Application PCT/AU2011/000957, filed Jul. 28, 2011, entitled: Luggage Processing Station.

Sanderson, Michael Dupre, et al.: U.S. Appl. No. 15/711,640, filed Sep. 21, 2017, entitled: "Luggage Processing Station".

* cited by examiner

LUGGAGE PROCESSING STATION

This application is continuation of U.S. patent application Ser. No. 15/711,640, which is a continuation of U.S. patent application Ser. No. 13/812,616, which is related to Australian Provisional Patent Application Nos. 2010903430 and 2010903367, and to the Applicant's co-pending PCT Application filed on 28 Jul. 2011 and entitled "Passenger and Luggage Management System", the entire disclosures of which are incorporated herein by way of reference.

The present disclosure relates to a processing station for luggage. The processing station has been developed primarily to facilitate self-service check-in of luggage for airline passengers and will be described hereinafter with reference to this application. However, it will be appreciated that the processing station may also be used for self-service check-in of luggage by passengers on trains, buses, ships and the like. Moreover, the processing station may also find other useful application in processing of articles other than luggage, and may be used, for example, in processing of warehoused goods.

One known luggage processing system involves a One Stop Check-In Kiosk/Bag Drop, whereby the kiosk is co-located with the bag drop point. This known system, however, requires a passenger to check-in at the combined kiosk/bag drop point before the passenger's luggage can be accepted, typically resulting in a long transaction time and causing queues during peak periods as the passenger is performing two operations at one location.

Another known system includes a self service check-in kiosk to generate a boarding card, with the customer then proceeding to a "bag drop". In this system, the "bag drop" is hosted where an airline agent scans the boarding pass and generates bag tags. Excess baggage charges, seating changes and other assistance is managed at this point. Typically, this results in a long transaction causing queues during peak periods.

A further known system includes a self service check-in kiosk to generate both a passenger boarding card and bag tags. The bag tags are applied by the passenger, who then proceeds to an open belt "bag drop". With this system, the "bag drop" has limited security checks and does not weigh or check the size of a piece of luggage bag at point of bag drop.

A yet further known system includes check-in kiosks which can be attached at a bag drop point. In such systems, a first kiosk is used to generate a boarding card and then a separate kiosk is used to generate a paper bag tag which the passenger applies. The passenger then places the tagged luggage on the bag injector. These combinations require the passenger to check-in at this point before luggage can be accepted, typically resulting in a long transaction time and causing queues during peak periods as the passenger is performing two operations at this location.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

Throughout this specification the word "comprise", or variations such as "comprises", "comprised of or "comprising", will be understood to imply the inclusion of a stated element, integer or step, or group of elements, integers or steps, but not the exclusion of any other element, integer or step, or group of elements, integers or steps.

In a first aspect, the present disclosure provides a processing station for registering a passenger's luggage for a trip, the processing station comprising:
  an injector for receiving a piece of luggage associated with the passenger;
  at least one sensor associated with the injector, the at least one sensor, in combination with walls and a floor of the injector, creating a six-sided virtual box around the piece of luggage;
  a weighing machine associated with the injector for weighing the piece of luggage whilst in the injector; and
  a controller associated with the sensor and weighing machine, the controller being adapted to:
    monitor, via the at least one sensor, intrusions through the virtual box to determine one or more of whether a predetermined limit on dimensions of the piece of luggage has been exceeded or whether a foreign object has intruded the virtual box from outside, and
    allow further processing of the piece of luggage only if no intrusion of the virtual box is detected.

The word "virtual box" throughout this specification is to be understood as meaning a box that is wholly or in part comprised of a non-physical barrier.

The controller may be adapted to accept the piece of luggage if feedback from the sensor and weighing machine indicate that dimensions and weight of the piece of luggage are within respective predetermined limits.

The dimensions of the virtual box may correspond with the predetermined limit on dimensions of the piece of luggage. The dimensions of the virtual box may be adjusted to conform to the respective regulatory standards on luggage dimensions for a particular airport. At least one side and the top of the virtual box may be generated by the at least one sensor. The at least one sensor may include one or more tunnel and/or laser sensors and/or light curtains and/or photo eyes. The at least one sensor may include a first sensor comprising a rotating laser for generating a first side of the virtual box. The at least one sensor may include a second sensor comprising a rotating laser for generating a second side of the virtual box. The first side of the virtual box may be a top of the virtual box, with the first laser rotating about a substantially vertical axis. The second side of the virtual box may be a vertical sidewall of the virtual box, with the second laser rotating about a substantially horizontal axis.

A user detection sensor may be provided to detect the presence of a user in a predetermined zone around the processing station. The predetermined zone may extend over an area around a user interface of the processing station and an access opening to the injector through which the user inserts a piece of luggage into the injector. The controller may be adapted to terminate processing of the piece of luggage if feedback from the user detection sensor indicates that the user has moved out of the predetermined zone prior to acceptance of the piece of luggage. The user detection sensor may comprise a rotating laser. The rotating laser of the user detection sensor may rotate about, a substantially vertical axis so as to generate a substantially horizontal said predetermined zone. The user detection sensor and the first sensor may be one and the same sensor.

The controller may be adapted to accept the piece of luggage for weighing via the weighing machine only if the virtual box is intact. If the virtual box is breached after weighing of the piece of luggage is complete, the controller may be adapted to cause the piece of luggage to be re-weighed once the breach of the virtual box is rectified.

The luggage processing station may comprise a user interface for receiving an input indicating whether the passenger has checked-in. The user interface may comprise an electronic card reader for reading an electronic passenger identification card. The input indicating whether the passenger has checked-in may be obtained by the electronic card reader of the luggage processing station reading the electronic passenger identification card. Alternatively, or in addition, the user interface may comprise a scanner for scanning the passenger's boarding pass. In such cases, the input indicating whether the passenger has checked-in may be obtained by the scanner of the luggage processing station reading the boarding pass. The user interface may comprise a display screen to display information to the passenger during processing of the piece of luggage. The display screen may be adapted to display a message directing the passenger to remove their luggage and check-in prior to attempting to process their luggage if the input indicates that the passenger has not checked-in. The user interface may also permit the passenger to input information to facilitate processing of the piece of luggage.

The display screen may be a touch screen.

The luggage processing station may comprise a detector for detecting whether the piece of luggage has a bag tag applied that stores information for associating the piece of luggage with the passenger and the passenger's trip. The controller may be responsive to the detector and may be adapted to reject the piece of luggage if the detector cannot detect the presence of a said bag tag. The trip information on the bag tag may comprise information for associating the passenger's luggage with a vehicle carrying the passenger on the trip. The bag tag may be an electronic bag tag and the luggage processing station may comprise a detector for detecting the presence of such an electronic bag tag. The luggage processing station may comprise an electronic writer for writing the trip information to the electronic bag tag. The luggage processing station may issue the passenger with a luggage receipt for accepted luggage with an electronic bag tag. The electronic bag tag may be an RFID tag and the luggage processing station may comprise an RFID antenna for detecting the presence of the RFID tag and/or reading information from the RFID bag lag and/or writing trip information to the RFID bag tag. The RFID antenna may be located below a floor of the injector. Several RFID antennas may be provided at spaced apart locations. For example, one RFID antenna may be located below a floor of the injector and another may be located above a floor of the injector. The tag may alternatively be a barcoded tag, such as a 1 D or 2D barcode tag. The luggage processing station may include one or more barcode scanners for detecting the presence of a barcoded tag on the piece of luggage. The barcode scanner(s) may be movable and may be located above the floor of the injector.

The controller may be adapted to require the piece of luggage to be marked as being heavy and/or to require the passenger to pay a surcharge and/or to reject the piece of luggage if the weighing machine indicates that the piece of luggage exceeds a predetermined weight or causes the passenger to exceed their maximum luggage weight entitlement. The controller may be adapted to require that a heavy tag be applied to the piece of luggage if it is identified as exceeding the predetermined weight. The controller may be adapted to prevent acceptance of the piece of luggage until the heavy tag is applied to the piece of luggage. The heavy tag may be a printed tag for application to the piece of luggage, and the printed tag may include visual indicia and/or a barcode for indicating weight data for the piece of luggage. A heavy tag printer may be provided for printing such a printed heavy tag. Alternatively, the heavy tag may be an electronic heavy tag for storing at least weight data for the piece of luggage. The electronic heavy tag may include visual indicia, such as colour coding or weight information, for indicating that the bag is heavy. The electronic heavy tag may include re-writable memory for storing the weight data. An electronic heavy tag writer may be associated with the injector for writing at least weight data for the piece of luggage to the electronic heavy tag. The electronic heavy tag may be a radio frequency identification (RFID) tag and the electronic heavy tag writer may be an RFID writer. The electronic heavy tag writer may be located below a floor of the injector.

The controller is also adapted to monitor the number of pieces of luggage processed by the passenger. If the passenger exceeds their luggage allowance, the controller is adapted to reject further luggage from the passenger. The controller may be adapted to accept further pieces of luggage from the passenger if the passenger elects to pay a surcharge. In such cases, the controller may be adapted to cause a printer associated with the luggage processing station to print an excess baggage receipt.

An injector conveyor may be provided in the floor of the injector for conveying the piece of luggage, if accepted, to a downstream collector conveyor system. Actuation of the conveyor may be controlled by the controller. The controller may be adapted to deactivate the conveyor if an intrusion through the virtual box is detected. If the luggage processing station is for processing of luggage for an aircraft trip, the controller may be adapted to close landside to airside barriers if an intrusion through the virtual box is detected. The controller may be adapted to cause a notification to be sent to a security system or security personnel if an intrusion through the virtual box from outside by a foreign object is detected. The notification may comprise triggering of a security alarm. The controller may be adapted to allow processing of the piece of luggage to continue or to be restarted if a predetermined security code is input and/or if electronic identification meeting predetermined criteria is provided. The predetermined security code may be input via an Airline Security Identification Card (ASIC). The controller may be adapted to allow manual processing of the piece of luggage via the processing station to continue if the predetermined security code is input. The controller may be adapted to allow manual actuation of the injector conveyor in a forward direction if the predetermined security code is input. The controller may be adapted to allow manual actuation of the injector conveyor in a reverse direction if the predetermined security code is input. The controller may be adapted to permit deactivation of a security alarm if the predetermined security code is input. The controller may be adapted to permit different levels of access to the luggage processing station depending on the predetermined security code that is input.

The scanner may be adapted to receive boarding passes of various types, such as a 2D identifier displayed on a screen, a 2D printed identifier, and/or to confirm passenger check-in via an electronic identifier stored on a passenger identification card or stored on an electronic device such as a mobile phone and transmitted using near-field RFID. The 2D identifier may be a barcode or other unique visual indicia. In embodiments where check-in is confirmed via a passenger identification card, a receipt for the piece of luggage may also be written to the card. An electronic writer may be provided for writing the receipt for the piece of luggage to the passenger identification card. The passenger identification card may be an RFID card and the electronic writer may comprise an RFID antenna. Alternatively, a luggage receipt printer may be provided for printing a luggage receipt for accepted luggage.

Monitoring devices may be provided around the injector to detect when luggage is placed in the injector as well as intrusion during processing of the piece of luggage. The monitoring devices may comprise one or more of lasers, photo eyes and light curtains and/or photo eyes.

A tub embedded with an electronic tag may be provided for awkward bags.

One or more cameras or other image capturing devices may be positioned around the injector to record images of luggage accepted. The image capturing devices may facilitate determination of intrusions, including the location of intrusions, into the virtual box, and/or may facilitate determination of the size of a piece of luggage in the injector and/or its suitability for handling by a downstream luggage processing system.

In a second aspect, the present disclosure provides a processing station for registering a passenger's luggage for a trip, the processing station comprising:
- an injector for receiving a piece of luggage associated with the passenger;
- at least one sensor associated with the injector for sensing whether the dimensions of the piece of luggage exceed a predetermined limit;
- a weighing machine associated with the injector for weighing the piece of luggage whilst in the injector;
- a controller associated with the sensor and weighing machine, the controller being adapted to accept the piece of luggage if feedback from the sensor and weighing machine indicate that dimensions and weight of the piece of luggage are within respective predetermined limits; and
- an injector conveyor in the floor of the injector for conveying the piece of luggage in a first direction, if accepted, to a downstream collector conveyor system, wherein a walled enclosure is provided around the injector to restrict loading of luggage into the injector to a single side access opening that provides for loading of luggage into the injector only in a direction transverse to the first direction.

In a third aspect, the present disclosure provides a processing station for registering a passenger's luggage for a trip, the processing station comprising:
- an injector for receiving a piece of luggage associated with the passenger; and
- an injector conveyor in the floor of the injector for conveying the piece of luggage to a downstream collector conveyor system,
- wherein a recess is provided under the injector conveyor, an RFID antenna being housed in the recess for reading an RFID tag associated with a piece of luggage, and wherein a top surface of the antenna is positioned flush with the underside of the injector conveyor.

At least one sensor may be associated with the injector for sensing whether the dimensions of the piece of luggage exceed a predetermined limit.

A weighing machine may be associated with the injector for weighing the piece of luggage whilst in the injector. The weighing machine may be located under the injector conveyor and the recess may be provided in the weighing machine.

A controller may be associated with the sensor and/or weighing machine, the controller being adapted to accept the piece of luggage if feedback from the sensor and/or weighing machine indicate that dimensions and weight of the piece of luggage are within respective predetermined limits.

In a fourth aspect, the present disclosure provides a processing station for registering a passenger's luggage for a trip, the processing station comprising:
- an injector for receiving a piece of luggage associated with the passenger;
- a weighing machine associated with the injector for weighing the piece of luggage whilst in the injector;
- a controller associated with the weighing machine, the controller being adapted to accept the piece of luggage if feedback from the weighing machine indicates that the weight of the piece of luggage is within a predetermined limit that is selected based on one or more of the parameters selected from the group consisting of: a maximum weight for occupational health and safety reasons, a weight above which a heavy tag must be applied to the piece of luggage before acceptance, payload capacity of the vehicle carrying the passenger's luggage on the trip, a weight above which an additional fee must be paid before acceptance of the piece of luggage.

The controller may be adapted to require the piece of luggage to be marked as being heavy and/or to require the passenger to pay a surcharge and/or to reject the piece of luggage if the weighing machine indicates that the piece of luggage exceeds a predetermined weight or causes the passenger to exceed their maximum luggage weight entitlement. The controller may be adapted to require that a heavy tag be applied to the piece of luggage if it is identified as exceeding the predetermined weight. The controller may be adapted to prevent acceptance of the piece of luggage until the heavy tag is applied to the piece of luggage. The heavy tag may be a printed tag for application to the piece of luggage, and the printed tag may include visual indicia and/or a barcode for indicating weight data for the piece of luggage. A heavy tag printer may be provided for printing such a printed heavy tag. Alternatively, the heavy tag may be an electronic heavy tag for storing at least weight data for the piece of luggage. The electronic heavy tag may include visual indicia, such as colour coding or weight information, for indicating that the bag is heavy, The electronic heavy tag may include re-writable memory for storing the weight data. An electronic heavy tag writer may be associated with the injector for writing at least weight data for the piece of luggage to the electronic heavy tag. The electronic heavy tag may be a radio frequency identification (RFID) tag and the electronic heavy tag writer may be an RFID writer. The electronic heavy tag writer may be located below a floor of the injector. The controller may be adapted to cause a sensor to scan the piece of luggage, after application of the heavy tag to the piece of luggage, to confirm that the heavy tag applied to the piece of luggage is the correct tag. This confirmation may be based on sequential coding of the heavy tag.

Alternatively, or in addition, the controller may be adapted to transmit a message to the passenger offering for the passenger to re-pack the piece of luggage so as to reduce its weight to below the predetermined weight, prior to re-weighing the piece of luggage. The message may be displayed on a display screen associated with the injector.

If the trip includes travel by aircraft, the controller may be adapted to transmit weight information associated with the piece of luggage to a flight management system for aircraft weight and trim purposes.

An injector conveyor may be provided in the floor of the injector for conveying the piece of luggage, if accepted, to a downstream collector conveyor system. A recess may be provided under the injector conveyor, and an RFID antenna may be housed in the recess for reading an RFID tag associated with a piece of luggage. A top surface of the antenna may be positioned flush with the underside of the injector conveyor. The weighing machine may be located under the injector conveyor.

At least one sensor may be associated with the injector for sensing whether the dimensions of the piece of luggage exceed a predetermined limit. The controller may be associated with the sensor and adapted to accept the piece of luggage if feedback from the sensor indicates that dimensions of the piece of luggage are within predetermined limits.

The at least one sensor, in combination with walls and a floor of the injector, may create a six-sided virtual box around the piece of luggage. The dimensions of the virtual box may correspond with the predetermined limits on dimensions of the piece of luggage. The dimensions of the virtual box may. be adjusted to conform (o the respective regulatory standards on luggage dimensions for a particular airport. At least one side and the top of the virtual box may be generated by the at least one sensor. The at least one sensor may include tunnel and/or laser sensors.

The controller may be adapted to accept the piece of luggage for weighing via the weighing machine only if the virtual box is intact. If the virtual box is breached after weighing of the piece of luggage is complete, the controller may be adapted to cause the piece of luggage to be re-weighed once the breach of the virtual box is rectified.

In a fifth aspect, the present disclosure provides a processing station for registering a passenger's luggage for a trip, the processing station comprising:
an injector for receiving a piece of luggage associated with the passenger;
a weighing machine associated with the injector for weighing the piece of luggage whilst in the injector;
at least one RFID antenna associated with the injector, the at least one RFID antenna being adapted to read first information from an RFID tag associated with the piece of luggage and to write second information to the RFID tag; and
a controller associated with the weighing machine and the RFID antenna, the controller being adapted to control operation of the RFID antenna and to accept the piece of luggage if:
feedback from the weighing machine indicates that weight of the piece of luggage is within a predetermined limit, and
the RFID antenna reads the first information from the RFID tag on the piece of luggage after writing the second information to the RFID tag to confirm that the antenna has written to correct RFID tag.

The second information written to the RFID tag may classify the piece of luggage as being one or more of: a heavy piece of luggage, a priority piece of luggage, a piece of luggage with special handling requirements, and a piece of luggage of a special class. The processing station may form part of a luggage processing system that also comprises a said RFID Lag. The RFID tag may be encoded with a unique RFID tag identifier. The first information may comprise the unique RFID Lag identifier.

In a sixth aspect, the present disclosure provides a processing station for registering a passenger's luggage for a trip, the processing station comprising:
a luggage transportation tub having an RFID tag fixedly connected thereto, the tub being adapted to receive a piece of luggage associated with the passenger;
an injector for receiving the tub with the luggage therein;
a weighing machine associated with the injector for weighing the tub and the piece of luggage therein whilst in the injector;
at least one RFID antenna associated with the injector, the at least one RFID antenna being adapted to read information from the RFID tag on the tub; and
a controller associated with the weighing machine and the RFID antenna, the controller being adapted to control operation of the RFID antenna and to accept the piece of luggage if:
an input indicates that the piece of luggage requires the use of a said luggage transportation tub;
feedback from the weighing machine indicates that weight of the piece of luggage is within a predetermined limit, and
the RFID antenna reads the RFID tag on the tub and the controller determines from the information read from the RFID tag that the piece of luggage is in the tub.

In a seventh aspect, the present disclosure provides a processing station for registering a passenger's luggage for a trip, the processing station comprising:
an injector for receiving a piece of luggage associated with the passenger;
an injector conveyor in the floor of the injector for conveying the piece of luggage to a downstream collector conveyor system;
a weighing machine associated with the injector for weighing the piece of luggage whilst in the injector;
at least one RFID antenna associated with the injector, the at least one RFID antenna being adapted to write information to an RFID tag associated with the piece of luggage and to read information from a said RFID tag; and
a controller associated with the weighing machine and the RFID antenna, the controller being adapted to control operation of the RFID antenna and to actuate the conveyor to move the piece of luggage by a predetermined distance if the RFID antenna cannot communicate with the RFID tag, the controller further being adapted to accept the piece of luggage if feedback from the weighing machine indicates that weight of the piece of luggage is within a predetermined limit.

The predetermined distance may be around 100 mm. The controller may be adapted to actuate the conveyor to move the piece of luggage by a further predetermined distance if movement by a first said predetermined distance does not result in the RFID antenna being able to communicate with the RFID tag. The controller may be adapted to actuate the conveyor to move the piece of luggage by a yet further predetermined distance if movement by the second said predetermined distance does not result in the RFID antenna being able to communicate with the RFID tag. The controller may be adapted to terminate processing of the piece of luggage if the RFID antenna is unable to communicate with the RFID tag after the movement of the piece of luggage by the yet further predetermined distance. Each movement of the piece of luggage by a predetermined distance may be in the same direction. The controller may be adapted to actuate a variable speed drive to actuate the conveyor. The controller may be adapted to actuate the variable speed drive at a lower frequency during movement of the piece of luggage by a said predetermined distance than during movement of the piece of luggage by the conveyor to a luggage processing system after acceptance of the piece of luggage. The controller may be adapted to actuate the conveyor to move the piece of luggage in an abrupt manner so as to facilitate reorientation of the RFID tag.

In an eighth aspect, the present disclosure provides a processing station for registering a passenger's luggage for a trip, the processing station comprising:
- an injector for receiving a piece of luggage associated with the passenger;
- an injector conveyor in the floor of the injector for conveying the piece of luggage to a downstream collector conveyor system;
- at least one sensor associated with the injector for sensing the position of the piece of luggage in the injector;
- a weighing machine associated with the injector for weighing the piece of luggage whilst in the injector;
- a controller associated with the sensor, the weighing machine and the injector conveyor, the controller being adapted to actuate the conveyor to reposition the piece of luggage if feedback from the sensor indicates that the piece of luggage is not within a predetermined zone of the injector.

The predetermined zone may be a zone in which the piece of luggage can be weighed by the weighing machine. Alternatively, or in addition, the predetermined zone may be a zone in which one or more sensors can determine whether the dimensions of the piece of luggage fall within predetermined limits. Alternatively, or in addition, the predetermined zone may be a zone in which one or more electronic readers can read a bag tag attached to the piece of luggage.

The controller may be adapted to cause a message to be transmitted to a user of the processing station if repositioning of the piece of luggage by the controller actuating the conveyor does not successfully move the piece of luggage into the predetermined zone. The message may include instructions to manually reposition the piece of luggage. The message may be displayed on a display screen associated with the injector.

The at least one sensor associated with the injector for sensing the position of the piece of luggage in the injector may comprise one or more photo eyes and/or tunnel and/or laser sensors and/or light curtains.

In a ninth aspect, the present disclosure provides a processing station for registering a passenger's luggage for a trip, the processing station comprising:
- an injector for receiving a piece of luggage associated with the passenger;
- an injector conveyor in the floor of the injector for conveying the piece of luggage to a downstream collector conveyor system;
- a weighing machine associated with the injector for weighing the piece of luggage whilst in the injector; and
- a controller associated with the weighing machine, the controller being adapted to accept the piece of luggage and actuate the conveyor if feedback from the weighing machine indicates that weight of the piece of luggage is within a predetermined limit,
- wherein weight specific logic associated with the controller is separated from other code associated with the controller.

The weight specific logic may be maintained in a first module or modules and the other code may be maintained in a second module or modules. The module(s) in which the weight specific code is maintained may have a version number distinct from the version number of the module(s) in which the other code is maintained.

In a tenth aspect, the present disclosure provides a processing station for registering a passenger's luggage for a trip, the processing station comprising:
- an injector for receiving a piece of luggage associated with the passenger;
- an injector conveyor in the floor of the injector for conveying the piece of luggage to a downstream collector conveyor system;
- at least one luggage tag sensor associated with the injector for sensing the position of the piece of luggage in the injector, the sensor being adapted to ignore bag tags that are sensed outside a predetermined zone;
- a weighing machine associated with the injector for weighing the piece of luggage whilst in the injector;
- a controller associated with the sensor, the weighing machine and the injector conveyor, the controller being adapted to accept the piece of luggage and actuate the conveyor if feedback from the sensor indicates that the piece of luggage has a luggage tag meeting predetermined requirements attached thereto.

The predetermined zone may be established based on x, y and z coordinates from the luggage tag sensor.

In a twelfth aspect, the present disclosure provides a processing station for registering a passenger's luggage for a trip, the processing station comprising:
- an injector for receiving a piece of luggage associated with the passenger;
- an injector conveyor in the floor of the injector for conveying the piece of luggage to a downstream collector conveyor system;
- a user detection sensor to detect the presence of a user in a predetermined zone around the processing station;
- a controller associated with the sensor and the injector conveyor, the controller being adapted to terminate processing of the piece of luggage if feedback from the sensor indicates that the user has moved out of the predetermined zone.

The predetermined zone may extend over an area around a user interface of the processing station and an access opening to the injector through which the user inserts a piece of luggage into the injector. The user detection sensor may comprise a rotating laser. The rotating laser of the user detection sensor may rotate about a substantially vertical axis so as to generate a substantially horizontal said predetermined zone.

An embodiment of a processing station for luggage in accordance with the present disclosure will now be described, by way of example only, with reference to the accompanying drawings, in which.

Figure 1:
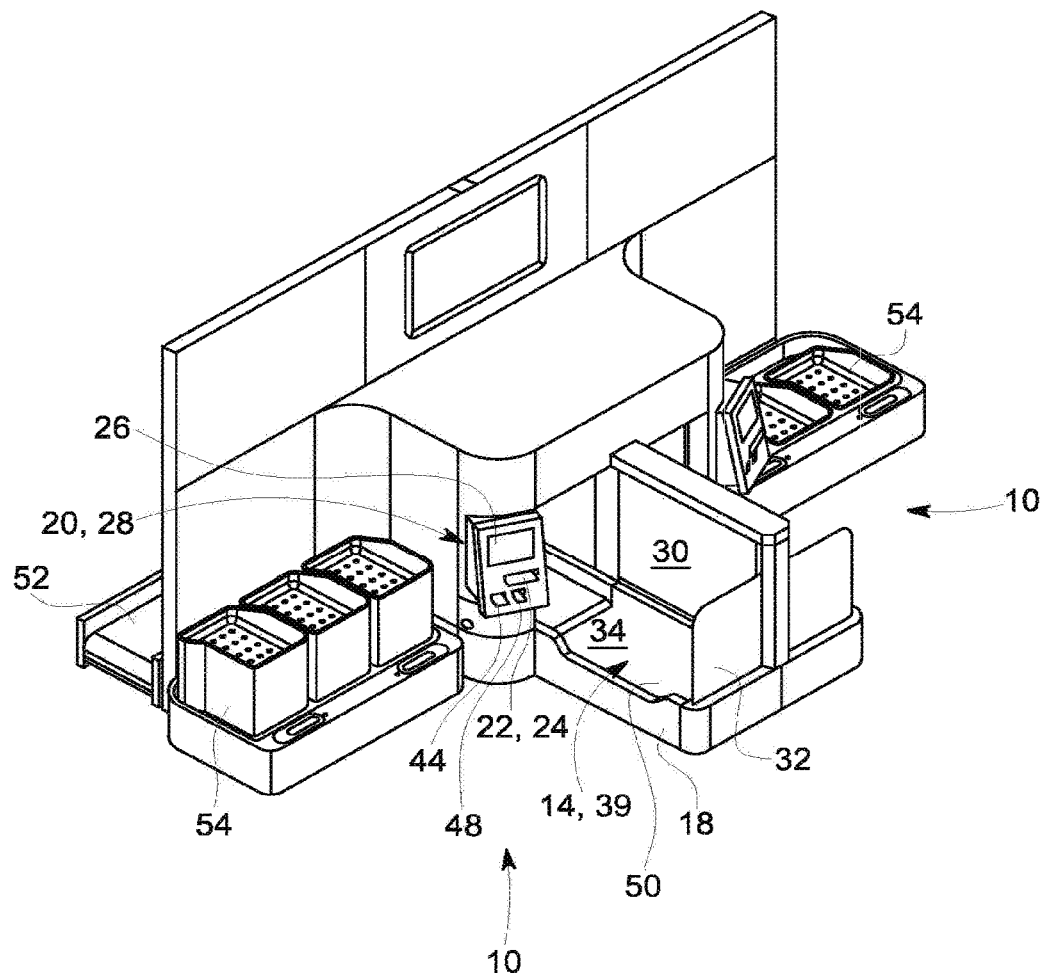
FIG. 1 is a perspective view of an embodiment of a luggage processing station in accordance with the present disclosure.
Figure 2:
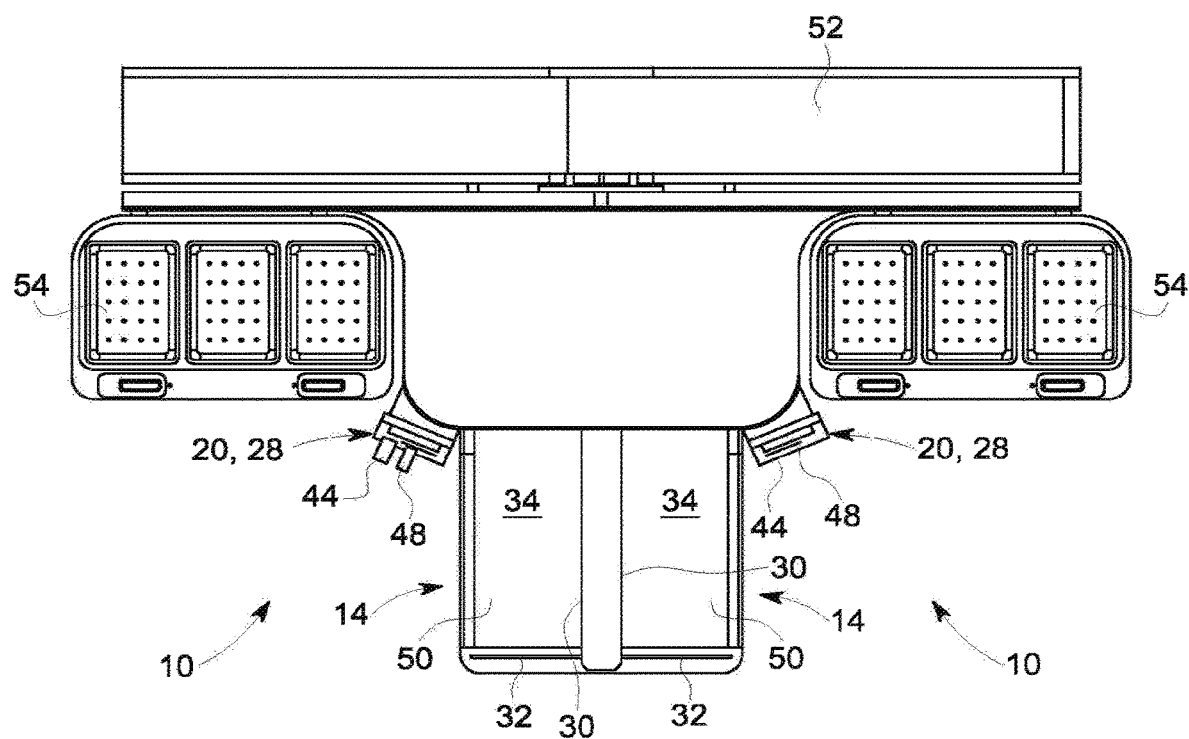
FIG. 2 is a plan view of the luggage processing station of FIG. 1.
Figure 3:
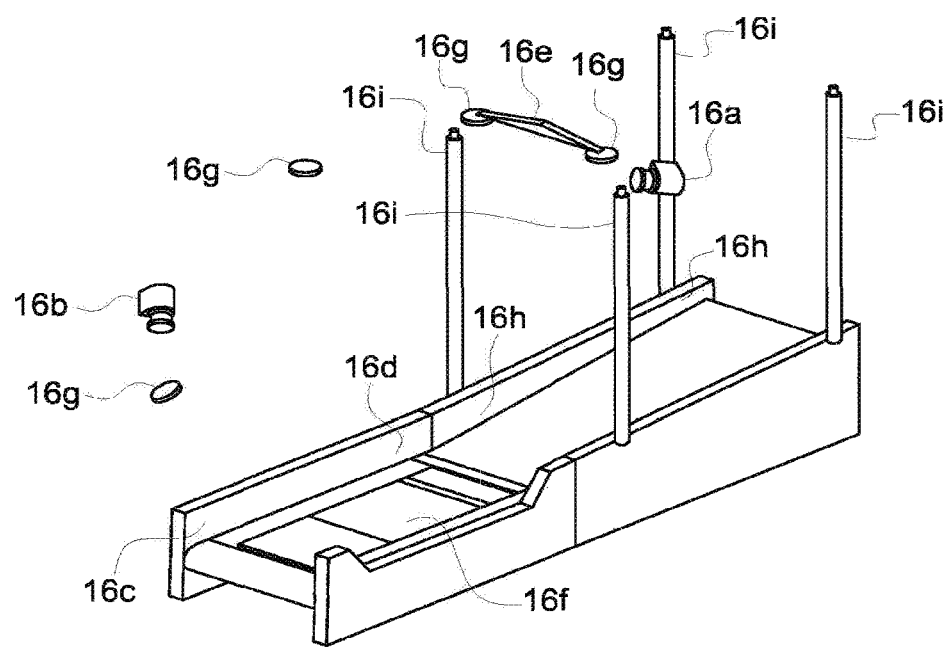
FIG. 3 is a schematic partial perspective view of the luggage processing station of FIG. 1, showing the location of various sensors.

Referring to the drawings, there is provided a processing station 10 for registering a passenger's luggage for a trip. The processing station 10 comprises an injector 14 for receiving a piece of luggage associated with the passenger. A plurality of sensors 16a-16i are associated with the injector. The sensors 1 6a-16i are described in detail below. A weighing machine 1 8 is also associated with the injector 14 for weighing the piece of luggage whilst in the injector 14. The luggage processing station 10 also comprises a user interface 20 for receiving various inputs for confirming that a passenger has checked-in. For example, the user interface 20 includes an electronic card reader, in the form of an RFID card scanner 22, for reading an electronic identifier from an electronic RFID-enabled passenger identification card to confirm passenger check-in. Alternatively, or in addition, the scanner 22 may be adapted to read an electronic identifier stored on an electronic device, such as a passenger's mobile phone, and transmitted to the scanner using near-field RFID to confirm passenger check-in. The user interface also includes a scanner 24 for scanning various types of passenger boarding passes, such as paper boarding passes with magnetic strips and printed boarding passes with 1 D or 2D barcodes. The user interface 20 may further include a magnetic card scanner for scanning magnetic strip-type passenger identification cards. The user interface comprises a touch screen display 26 to display information to the passenger during processing of the piece of luggage. The screen 26 is adapted to display a message directing the passenger to remove their luggage and check-in prior to attempting to process their luggage if the input indicates that the passenger has not checked-in, The screen 26 also permits the passenger to input information to facilitate processing of the piece of luggage.

A controller 28 is associated with the sensors 16a-16i and weighing machine 18 and the user interface 20. The controller 28 is adapted to accept the piece of luggage if the input received via the passenger's boarding pass or identification card indicate that the passenger has checked-in for the trip, feedback from the sensors 16a-16i indicates that predetermined criteria, which are discussed in more detail below, are met, and if feedback from the weighing machine 18 indicates that weight of the piece of luggage is within a predetermined limit.

Figure 4:
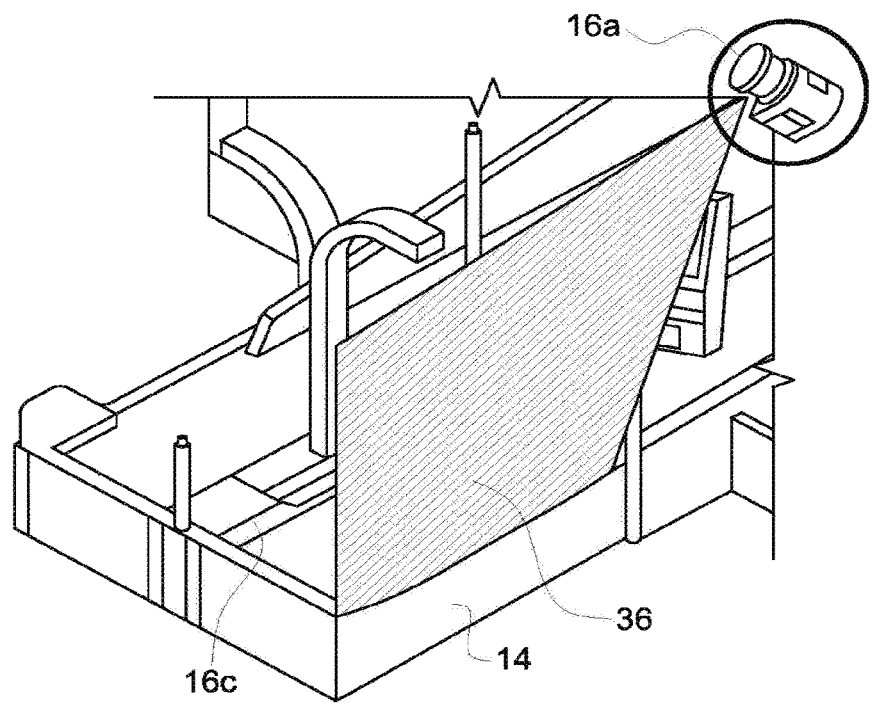
FIG. 4 is an enlarged schematic partial perspective view of the luggage processing station of FIG. 1, showing the generation of a side wall of a virtual box around the injector.
Figure 5:
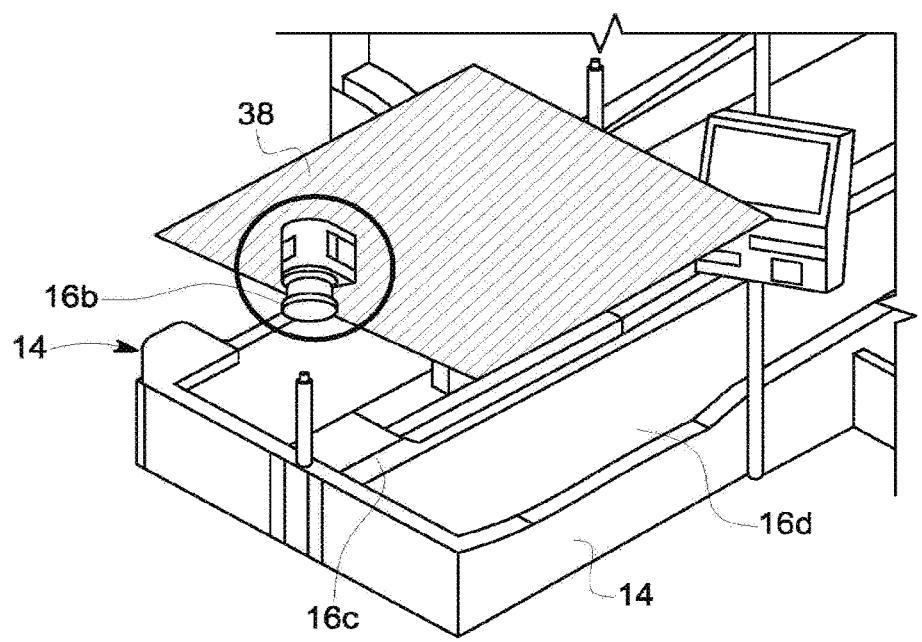
FIG. 5 is an enlarged schematic partial perspective view of the luggage processing station of FIG. 1, showing the generation of a top of a virtual box around the injector.
Figure 6:
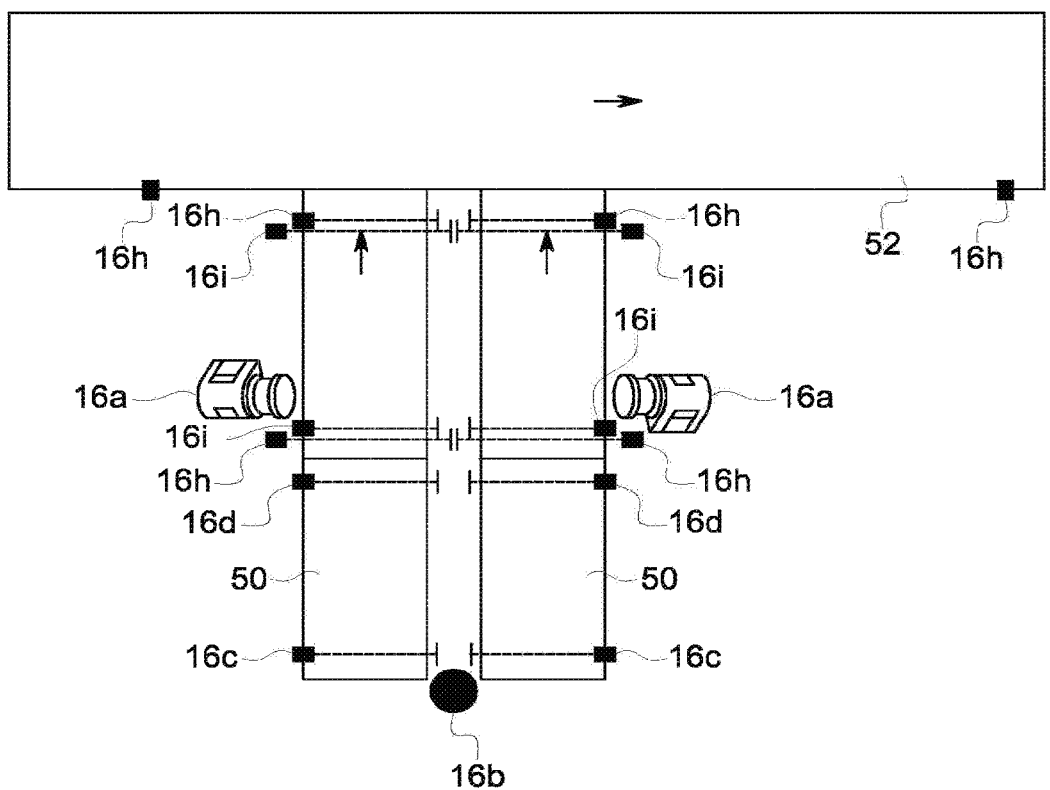
FIG. 6 is a schematic plan view of the processing station of FIG. 1, showing (he location of various sensors.

As shown in FIGS. 4 and 5, sensors 16a, 16b, 16c and 16d, in combination with walls 30, 32 and a floor 34 of the injector 14, create a six-sided virtual box around a loaded piece of luggage. Sidewall 36 and top 38 of the virtual box are generated by the sensors 16a and 16b, respectively, such that no physical barrier is provided on these sides of the injector 14, and thereby define a side access opening 39 to the injector 14 to facilitate a passenger side loading luggage into the injector 14 from a position adjacent the user interface 20. The sensors 16a and 16b include rotating lasers, with the laser of sensor 16a rotating about a horizontal axis to define sidewall 36 and the laser of sensor 16b rotating about a vertical axis to define top 38 to facilitate determination of whether the height and width of the loaded piece of luggage are within predetermined limits for acceptance. Sensors 16c and I 6d include photo eyes for facilitating positioning of the piece of luggage in the injector 14 and determining whether the length of the piece of luggage is within predetermined limits for acceptance. Walls 30 and 32 comprise a vertical glass panel to prevent unauthorised access to the piece of loaded luggage, whilst still allowing the piece of loaded luggage to be viewed. The height and width dimensions of the virtual box, and the positions of the sensors 1 6c and 16d, may be adjusted by a suitably authorised technician, for example to conform the luggage processing station to the regulatory standards on luggage dimensions for a particular airport.

The controller 28 is adapted to monitor, via sensors 16a and 16b, intrusions through the virtual box to determine whether a foreign object has intruded the virtual box from outside, which may indicate that the piece of luggage has been tampered with, and allow further processing of the piece of luggage only if no intrusion of the virtual box is detected. The controller 28 is also adapted to monitor, via sensors 16a, 16b, 16c and 16d, whether the dimensions of the piece of luggage are within the predetermined limits applicable to the particular airport, and allow further processing of the piece of luggage only if the predetermined limits are determined not to have been exceeded. The controller 28 is also adapted to monitor, via sensors 16c and 16d, whether the piece of luggage is correctly positioned in the injector 18 and allow further processing of the piece of luggage only if this is the case. If the piece of luggage is determined to be oversized, the controller 28 causes the screen 26 to display a message for the passenger to remove the piece of luggage and proceed with same to an oversize luggage processing counter. If the piece of luggage is determined to be overweight, the controller 28 may cause the screen 26 to display a message offering for the passenger to repack the piece of luggage to reduce its weight. If the piece of luggage is accepted for further processing, the controller 28 causes the piece of luggage to be weighed via the weighing machine 18. If the virtual box is breached after weighing of the piece of luggage is complete, the controller 28 is adapted to provide the passenger with a message indicating same via the user interface 20. Once the breach of the virtual box is rectified, the controller 28 is adapted to cause the piece of luggage to be re-weighed. If the virtual box continues to be breached by the piece of luggage, the controller 28 causes the screen 26 to display a message for the passenger to remove the piece of luggage and proceed with same to an oversize luggage processing counter.

The sensor 16b also functions as a user detection sensor to detect the presence of a user in a predetermined zone around the processing station 10. The predetermined zone extends over an area around the user interface 20 and the access opening 39 to the injector 14. The controller 28 is adapted to terminate processing of a piece of luggage if feedback from the sensor 16b indicates that the user has moved out of the predetermined zone prior to acceptance of the piece of luggage.

The luggage processing station 10 comprises detectors, comprising RF1D antennas 16e, 16f and bar code scanners 16g, for detecting whether the piece of luggage has a bag tag applied that stores information for associating the piece of luggage with the passenger and the passenger's trip. The controller 28 is responsive to the detectors and is adapted to reject the piece of luggage if the detectors cannot detect the presence of a bag lag storing the required information. The trip information on the bag tag comprises information for associating the passenger's luggage with a vehicle carrying the passenger on the trip, such as an aircraft IATA license plate. The bag tag may be an electronic bag tag containing an RFID chip readable by one of the RFID antennas 16e, I

6*f*. The RFID antennas 16*e*, 16*f* also function as writers for writing the trip information to the electronic bag tag and, in some embodiments, may be capable of reading information from the bag tag. The user interface includes a printer 44 for printing a luggage receipt for accepted luggage with an electronic bag tag. The tag may alternatively be a barcoded tag, such as a ID or 2D barcode paper tag, readable by barcode scanners 16*g*. The barcode scanners 16*g* are movable and are located above the floor 34 of the injector so as to have line of sight with the piece of luggage in the injector 14. The barcode scanners 16*g* are also programmed to ignore barcodes sensed outside a predetermined zone that is established based on x, y and z coordinates from the barcode scanners 16*g*. This reduces the risk of the barcode scanners 16*g* reading barcodes not associated with the piece of luggage in the injector 14.

The controller 28 is adapted to reject the piece of luggage if the weighing machine 18 indicates that the piece of luggage exceeds a predetermined weight and is thereby classified as heavy, but is still less than a maximum allowable weight. In such cases, the controller 28 is adapted to send a message indicating same to the passenger via the screen 26. Where the passenger has not exceeded their maximum luggage weight allowance, the message instructs the passenger to apply a heavy tag to the piece of luggage. To facilitate same, the controller 28 may cause a colour-coded, RFID, heavy tag to be dispensed by a heavy tag dispenser 48 associated with the injector 14 for application to the piece of luggage. Such an RFID heavy tag may have a re-writable memory for storing weight data for the piece of luggage conveyed via one of the RFID antennas 16*e*, 16*f* or via another RFID antenna prior to the tag being dispensed. The controller 28 may be adapted to cause one of the RFID antennas 16*e*, 16*f* to read the heavy tag after the weight data is written to the heavy tag and the tag is attached to the piece of luggage to confirm that the heavy tag on the piece of luggage is the same lag that was written to. This confirmation is facilitated by the tag having first information hard-coded thereon, the first information comprising a unique identifier, and the RFID reader reading this unique identifier both before writing to the tag and after writing to the tag to confirm that the unique identifier read before writing corresponds with the unique identifier read after writing. Alternatively, confirmation that the correct tag has been written to may be facilitated by sequential coding of dispensed tags. Sequential coding of tags is also used to facilitate monitoring of stock levels of tags in the processing station 10. If the sequential coding indicates that tag stock levels are below a predetermined level, the controller 28 is adapted to cause a message to be transmitted, for example by a beacon, SMS or paging, to alert staff to restock the tags. The dispensed heavy tag may alternatively take the form of a printed tag including visual indicia and/or a barcode for indicating weight data for the piece of luggage. If the piece of luggage is determined to exceed the maximum allowable weight, which may be based on a limit set for occupational health and safety reasons, then the controller 28 rejects the piece of luggage and causes a message to be sent to the passenger, via the screen 26, informing the passenger of same and offering for the passenger to repack the piece of luggage to reduce its weight. The maximum luggage weight allowance for the passenger may be affected by the payload capacity of the aircraft carrying the passenger on the trip and/or the passenger's status with the airline associated with the trip. The controller may be adapted to cause weight information associated with the piece of luggage to a flight management system for aircraft weight and trip purposes.

In some embodiments, a dispenser may be provided for dispensing paper tags for classifying the piece of luggage as being a priority piece of luggage, a piece of luggage with special handling requirements, and/or a piece of luggage of a special class.

The controller 28 is also adapted to reject the piece of luggage if a passenger has reached the maximum number of pieces of luggage in their luggage allowance or their maximum luggage weight allowance. In such cases, the controller 28 is adapted to send a message indicating same to the passenger via the screen 26. The message provides the passenger with options for rectifying the breach of their luggage entitlement, such as repacking their luggage to reduce weight or paying a surcharge. If the passenger elects to repack their luggage, the controller 28 causes the weighing machine 18 to re-weigh the luggage upon the passenger indicating via the touch screen 26 that the bags have been repacked and once the virtual box is detected to be intact. Alternatively, the passenger may elect to pay a surcharge to increase their luggage entitlement. Once rectification action has been taken by the passenger, the controller 28 checks again if the luggage is now within the passenger's entitlement and, if so, accepts the piece of luggage and causes the printer 44 to print a luggage receipt and/or an excess luggage receipt. Alternatively, as discussed above, where the passenger has a compatible electronic bag tag, the controller 28 causes one of the RFID antennas 16*e*, 16*f* to write to the electronic bag tag the data associating the piece of luggage with the passenger and the trip or vehicle on which the passenger is booked to travel. One of the RFID antennas may also be adapted to write to the electronic bag tag information classifying the piece of luggage as being a priority piece of luggage, a piece of luggage with special handling requirements, and/or a piece of luggage of a special class.

An injector conveyor 50 is provided in the floor of the injector 14. The weighing machine 18 is located below the injector conveyor 50 and has a recess therein for housing the antenna 16*f*, with a top surface of the antenna 16*f* being flush with the underside of the conveyor 50 when in position in the recess. The other RFID antenna 16*e* is located above the floor of the conveyor 50, The controller 28 is adapted to actuate the conveyor 50 if feedback from the sensors 16*c*, 16*d* indicates that the piece of luggage is not within a predetermined zone of the injector 14, this zone being a zone within which the piece of luggage can be weighed by the weighing machine, have its maximum length checked by the sensors 16*c*, 16*d*, and have any bag tags thereon read by the RFID antennas 16*e*, 16*f* and/or barcode scanners 16*g*. The controller 28 is also adapted to actuate the conveyor 50 if none of the RFID antennas 16*e*, 16*f* and/or the barcode scanners 16*g* is able to communicate with a bag tag on the piece of luggage. In such a case, the conveyor is first moved by a distance of approximately 100 mm and communication with the bag tag is attempted again. If communication with the bag tag is still not possible, the conveyor is moved by a further distance of 100 mm and communication is attempted again. If communication with the bag tag still fails after three movements of the conveyor 50, the controller 28 may be adapted to transmit a message to the display screen 26 instructing the passenger to manually reposition the piece of luggage and/or bag tags, and/or to terminate processing of the piece of luggage.

Once a piece of luggage has been accepted, the controller 28 actuates the injector conveyor 50 to convey the piece of luggage to a downstream collector conveyor system 52. The conveyor 50 may be actuated by a variable speed drive that runs at a lower frequency during movement of the conveyor 50 by the 100 mm increments than during movement of the conveyor 50 to convey a piece of luggage to the downstream collector conveyor system 52. The controller 50 may be adapted to actuate the conveyor 50 to move the piece of luggage in an abrupt manner when moving by the 100 mm increments to facilitate reorientation of the RFID tag.

In some embodiments, the controller 28 is adapted to deactivate the conveyor 50 if an intrusion through the virtual box is detected via sensors 16a and 16b during processing of a piece of luggage in the injector 14. The controller 28 may also be adapted to close landside to airside barriers if an intrusion through the virtual box is detected. The controller 28 may further be adapted to cause a notification, such as triggering of a security alarm, to be sent to a security system or security personnel if an intrusion through the virtual box from outside by a foreign object is detected. The controller 28 may be adapted to allow processing of the piece of luggage to continue or to be restarted if a predetermined security code is input and/or if electronic identification meeting predetermined criteria is provided. The predetermined security code may be input via an Airline Security Identification Card (ASIC). The controller 28 may be adapted to allow manual processing of the piece of luggage via the processing station 10 to continue if the predetermined security code is input. The controller 28 may be adapted to allow manual actuation of the injector conveyor 50 in a forward or reverse direction if the predetermined security code is input to send luggage to the downstream collector conveyor system 52 or return a piece of luggage from downstream. The controller 28 may be adapted to permit deactivation of a security alarm if the predetermined security code is input. The controller 28 may be adapted to permit different levels of access to the luggage processing station 10 depending on the predetermined security code that is input.

Monitoring devices may be provided around the injector 14 to detect when luggage is placed in the injector 14 as well as intrusion during processing of the piece of luggage and delivery of the piece of luggage to the downstream collector conveyor system. The monitoring devices may comprise one or more of lasers, photo eyes 16h and light curtains 16i.

The user interface 20 may be adapted to require the passenger to answer questions about the configuration of their luggage. If the passenger's answers indicate that the luggage may cause problems with downstream luggage handling apparatus, for example due to having straps or being unusually configured, the luggage may be classified as an awkward bag and the user interface 20 may be adapted to instruct the passenger to place the luggage into a luggage transportation tub 54 and to place the tub 54 with the luggage therein in the injector 14. The luggage transportation tub 54 is embedded with an electronic RFID tag that is integrally connected to the tub 54, for example by being moulded into the tub 54. The controller 28 is adapted to only allow the awkward luggage to be processed if feedback from the RFID antennas 16c, 16f indicates that the luggage is in a tub 54. When a piece of luggage in a tub 54 is detected, the controller 28 is adapted to automatically deduct the weight of the tub 54 from the weight measured by the weighing machine 18 to determine the actual weight of the piece of luggage.

One or more cameras may also be positioned around the injector to record images of luggage accepted. The cameras, or other image capturing devices, may also be used to detect the location of intrusions through the virtual box.

Weight specific logic associated with the controller 28 and governing its relationship with the weighing machine 18 is separated from other code associated with the controller 28. The weight specific logic is maintained in a first module having a unique version number and the other code is maintained in a separate module or modules having a unique version number of numbers that is distinct from the version number of the module in which the weight specific logic is maintained. In this manner, changes to non-weight related aspects of the code/logic associated with the controller 28 do not require recertification of the processing station 10 as a weighing device. The weighing device is adapted to automatically recalibrate itself to zero weight after acceptance of a piece of luggage and before weighing a new piece of luggage.

The processing station 10 is adapted to store a history of accepted luggage to facilitate investigations. The controller 28 may be adapted to allow the history to be printed if a user provides a predetermined security code. The security code may be provided in a number of formats, as discussed above with respect to overriding of security alarms.

Figure 7:
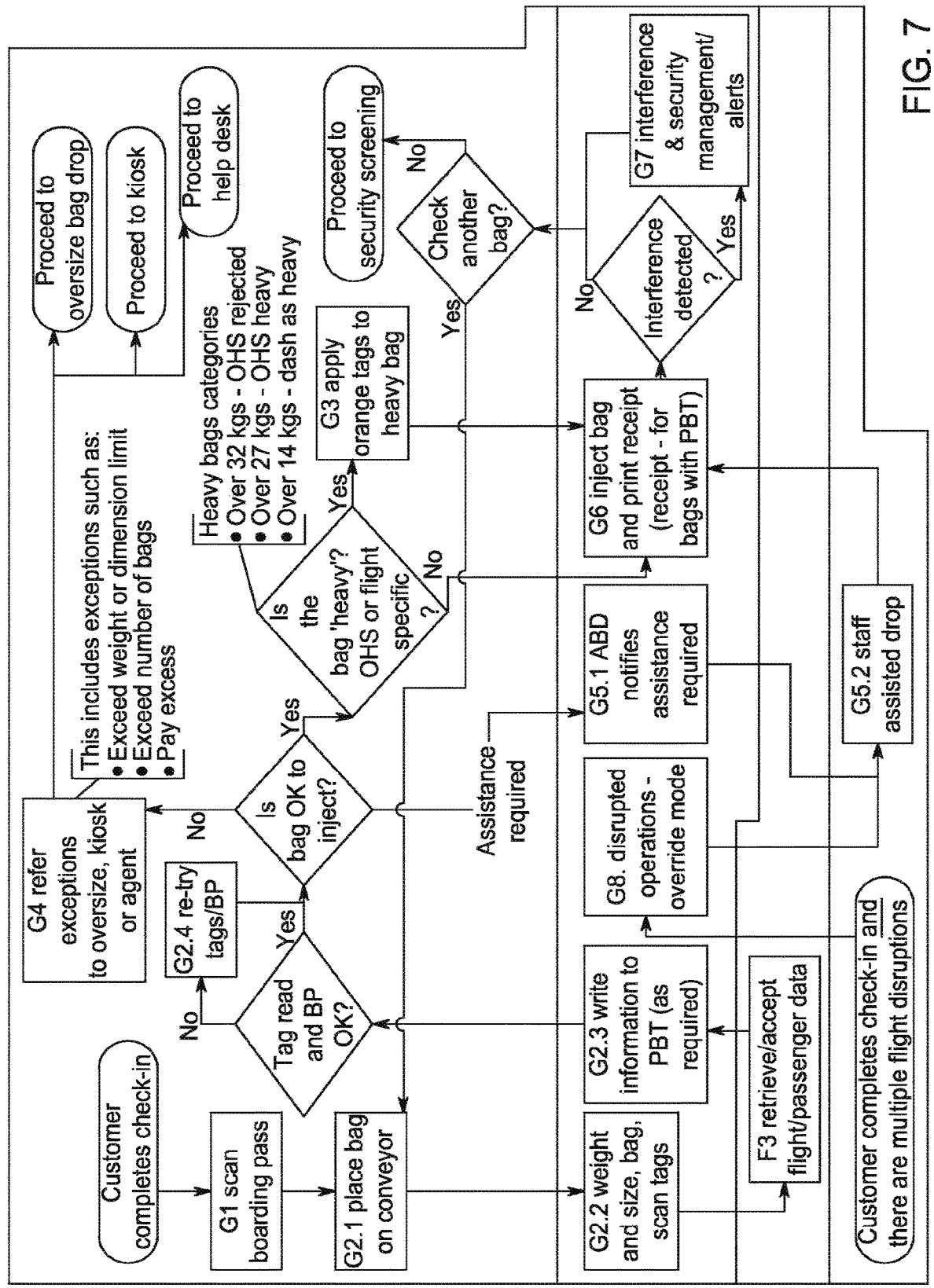
FIG. 7 is a flow chart of luggage processing using the luggage processing station of FIG. 1.

FIG. 7 shows a flow chart summarising a luggage handling process utilising the processing station 10.

It will be appreciated that the above described and illustrated processing station 10 provides many advantages over conventional passenger luggage handling systems, some of which are discussed above, but which additionally include:

- providing for luggage processing and injection only at the processing station 10, which largely mitigates queues;
- providing enhanced security and safety checks to detect incidence of luggage tampering;
- providing the ability to write information, such as flight and weight information, to electronic bag tags;
- speeding up the process of checking in luggage for a flight;
- facilitates passenger self-service;
- facilitates the passenger staying within the predetermined zone covered by sensor 16b during loading and processing of the piece of luggage due to the orientation of the access opening 39 transverse to the axis of the conveyor 50, in combination with the positioning of walls 32 and 34 and with the positioning of the user interface 20 on the same side of the conveyor 50 as the access opening 39;
- reducing the risk of reading from and/or writing to RFID tags not associated with a piece of luggage in the injector by housing the RFID antenna 16f in a recess underneath the conveyor 50;
- increasing the incidence of non-communication between tags and the RFID antennas 16e, 16f and/or barcode scanners 16g by automatically adjusting the position of the piece of luggage using the conveyor 50 if communication cannot be established;
- accepting multiple boarding pass types;
- accepting multiple bag tag devices;
- luggage acceptance area monitored with lasers, photo eyes and light curtains to detect when baggage is placed in the area as well as intrusion during the acceptance process;
- weighing and measurement of luggage in the baggage acceptance area;
- an interactive user interface;
- printers embedded to print out excess baggage receipts and heavy tags embedded with RFID to ensure the tag is attached when a bag is heavy;

tubs embedded with RFID are used for awkward bags so that they can be detected when used; and use of cameras to record images of bags accepted.

It will be appreciated by persons skilled in the art that numerous variations and/or modifications may be made to the above-described embodiments without departing from the broad general scope of the present disclosure. The embodiments described are, therefore, to be considered in all respects as illustrative and not restrictive.

What is claimed is:

1. A luggage processing station adapted to process a piece of luggage, the luggage processing station comprising:
   an injector adapted to receive the piece of luggage, wherein the injector comprises an injector conveyor belt integrated into a floor of the injector;
   a group of sensors;
      wherein at least one sensor is positioned around the injector directed towards the injector conveyor belt and at least one sensor is directed toward a predetermined zone;
   a controller adapted to assess the piece of the piece of luggage compared to an acceptance parameter whilst the piece of luggage is stationary on the injector conveyor belt; and
   wherein the controller is configured to actuate the injector conveyor belt when the controller assesses the piece of luggage as meeting the acceptance parameter and a person staying within the predetermined zone.

2. The luggage processing station of claim 1, wherein the piece of luggage is maintained in stationary position on the injector conveyor belt until the acceptance parameter is determined to be accepted by the controller.

3. The luggage processing station of claim 1, wherein the group of sensors is configured to sense the piece of luggage whilst the piece of luggage is stationary on the injector conveyor belt.

4. The luggage processing station of claim 1, wherein the acceptance parameter is that a luggage tag applied to the piece of luggage is readable by an electronic reader around the injector.

5. The luggage processing station of claim 1, wherein the injector conveyor belt is adapted to convey the piece of luggage to a downstream collector conveyor belt.

6. The luggage processing station of claim 5, wherein the injector conveyor belt is parallel to the ground upon which the injector is mounted.

7. A process for processing a piece of luggage, wherein the process comprises, in order:

i. a controller receiving input from a group of sensors mounted on an injector to determine at least one of size, shape, weight and tag readability of the piece of luggage, the piece of luggage located on an injector conveyor belt of the injector;
   ii. the controller determining whether the piece of luggage meets a predetermined acceptance parameter and whether a person stays within a predetermined zone; and
   iii. the controller actuating the injector conveyor belt when the piece of luggage meets the acceptance parameter.

8. The process of claim 7, wherein the injector conveyor belt conveys the piece of luggage to a downstream collector conveyor belt upon the acceptance parameter being determined to be met by the controller.

9. The process of claim 8, comprising maintaining the piece of luggage in stationary position on the injector conveyor belt until the acceptance parameter is met.

10. A processing station for registering a passenger's luggage, the processing station comprising:
    an injector for receiving a piece of luggage associated with the passenger, the injector including an injector conveyor belt provided in a floor of the injector;
    a group of sensors comprising at least one sensor associated with the injector for sensing the piece of luggage and at least one sensor for sensing a passenger staying within a predetermined area; a controller associated with the group of sensors, the controller being adapted to monitor the group of sensors; and
    a user interface electrically connected to the controller, wherein the user interface includes a display screen for displaying messages to the passenger, and wherein the display screen is a touch screen.

11. The station of claim 10, wherein the display screen is configured to display error message regarding the processing of the luggage to the passenger.

12. The station of claim 10, wherein the touch screen is adapted to allow the passenger to input information to facilitate the processing of the piece of luggage.

13. The station of claim 10, wherein the display screen is mounted on the injector.

14. The station of claim 13, wherein the display screen is mounted on one side of the injector at a predetermined angle of deflection away from a longitudinal axis of the injector.

* * * * *